May 8, 1928.　　　　　　　　　　　　　　　　　　　1,668,885
J. S. BARNES
MACHINE TOOL
Filed May 21, 1924　　　　5 Sheets-Sheet 4
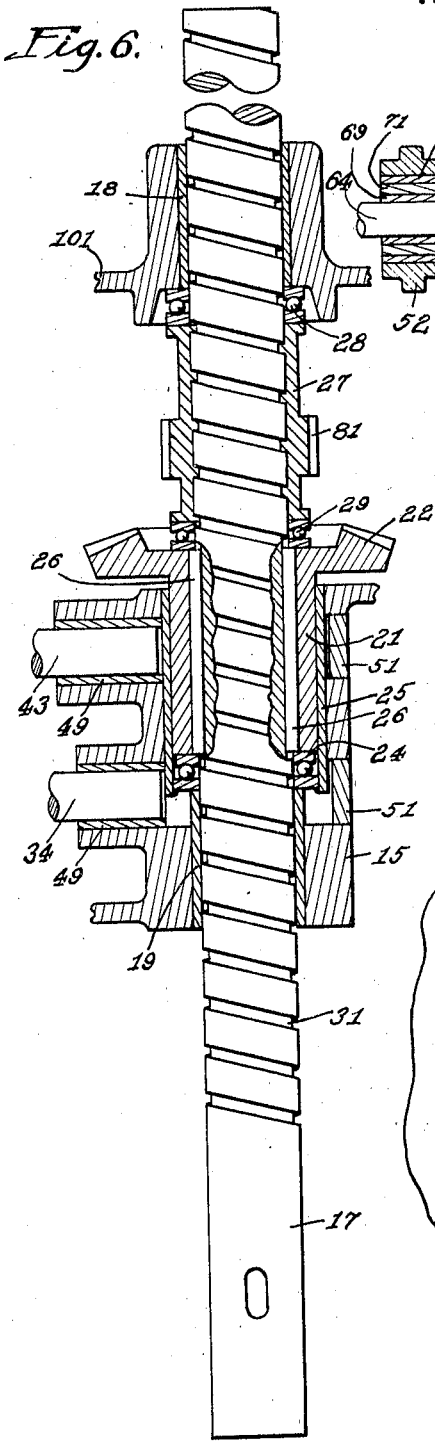
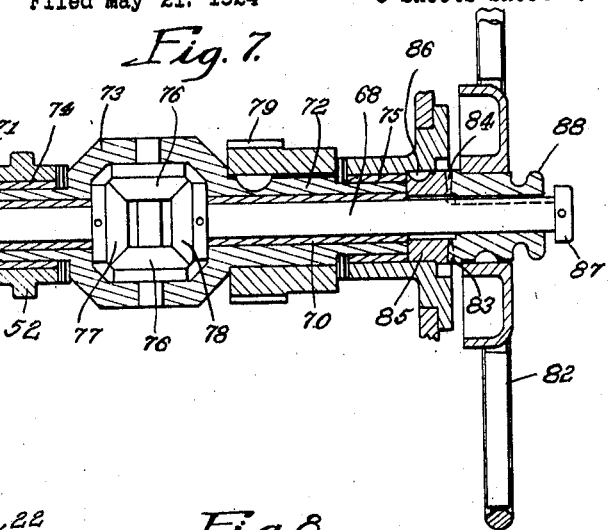
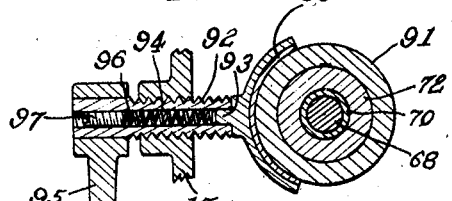
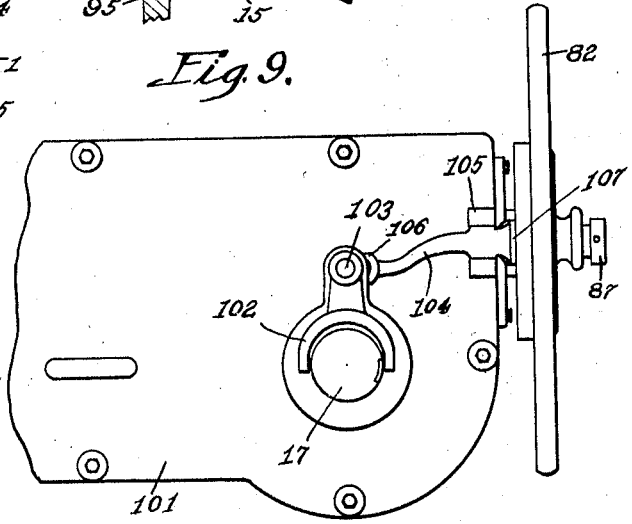
Inventor:
John S. Barnes
By Wilson & McKenna
Attys.

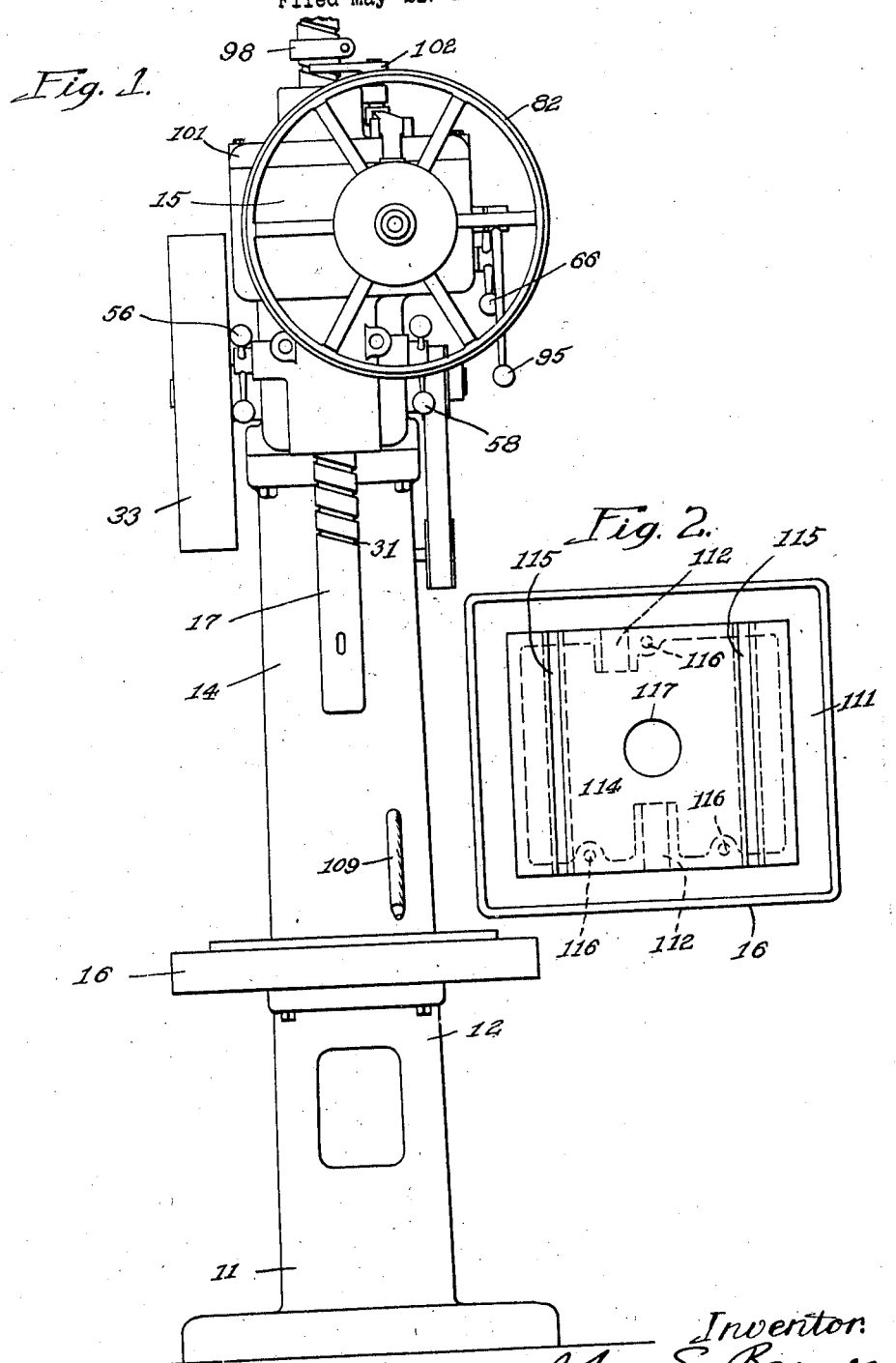

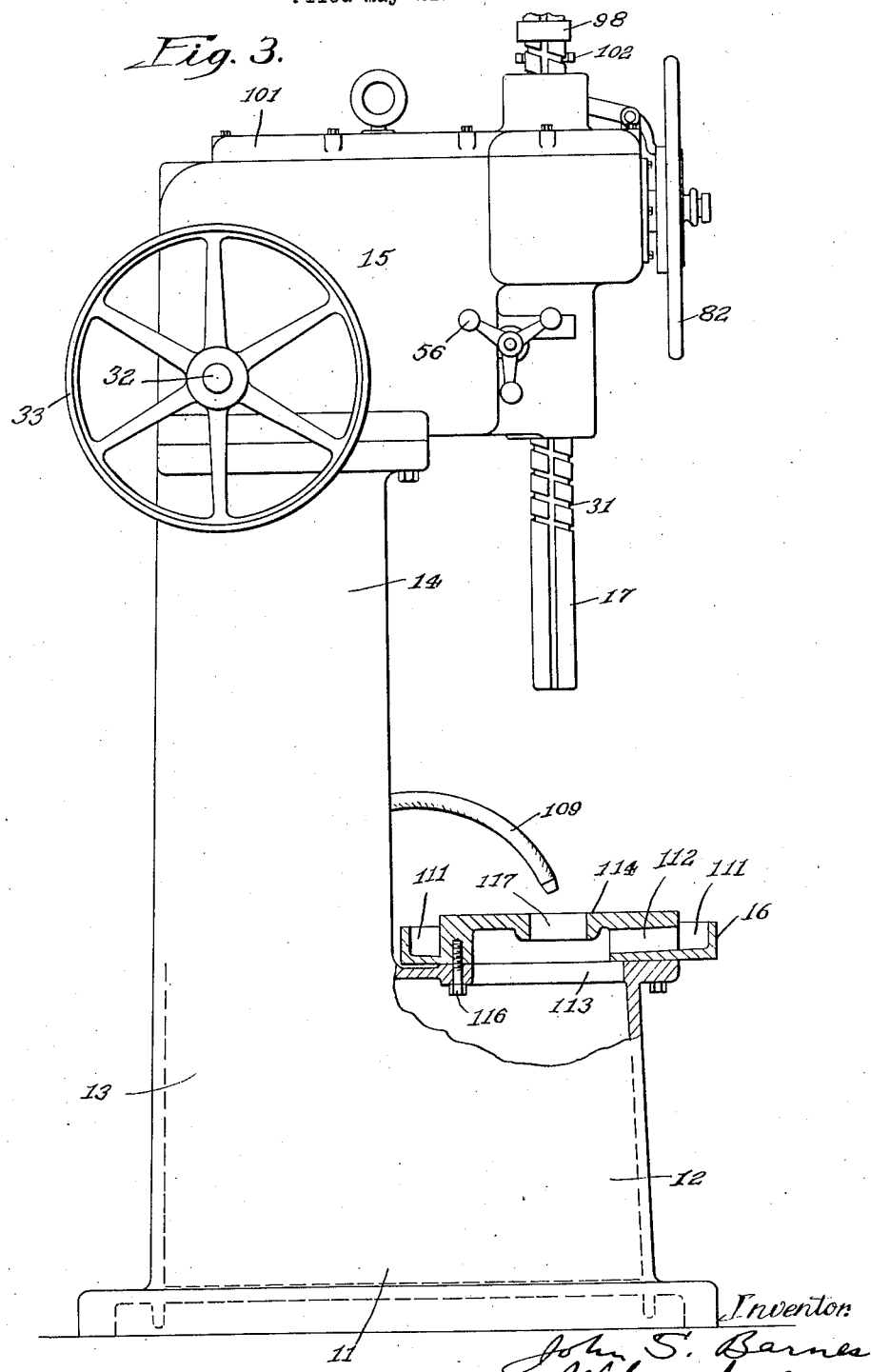

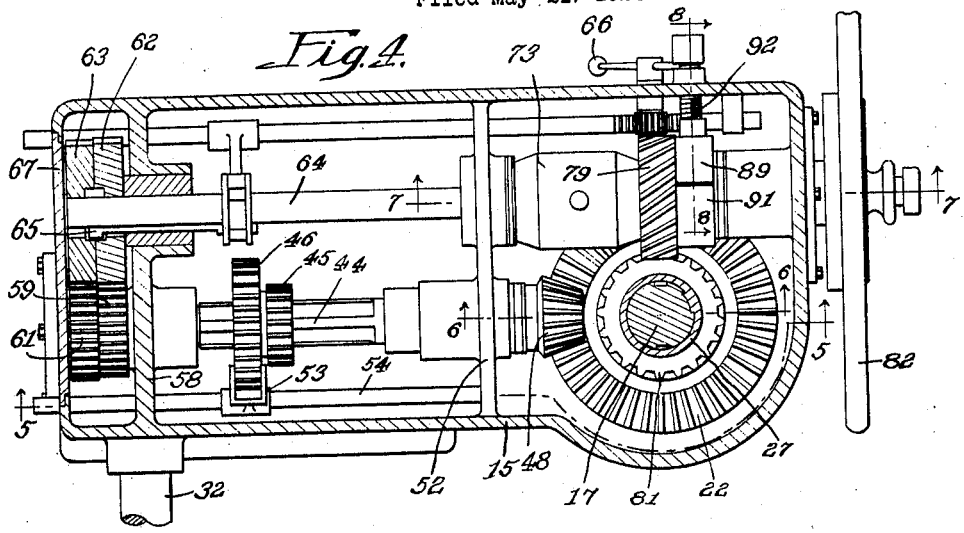
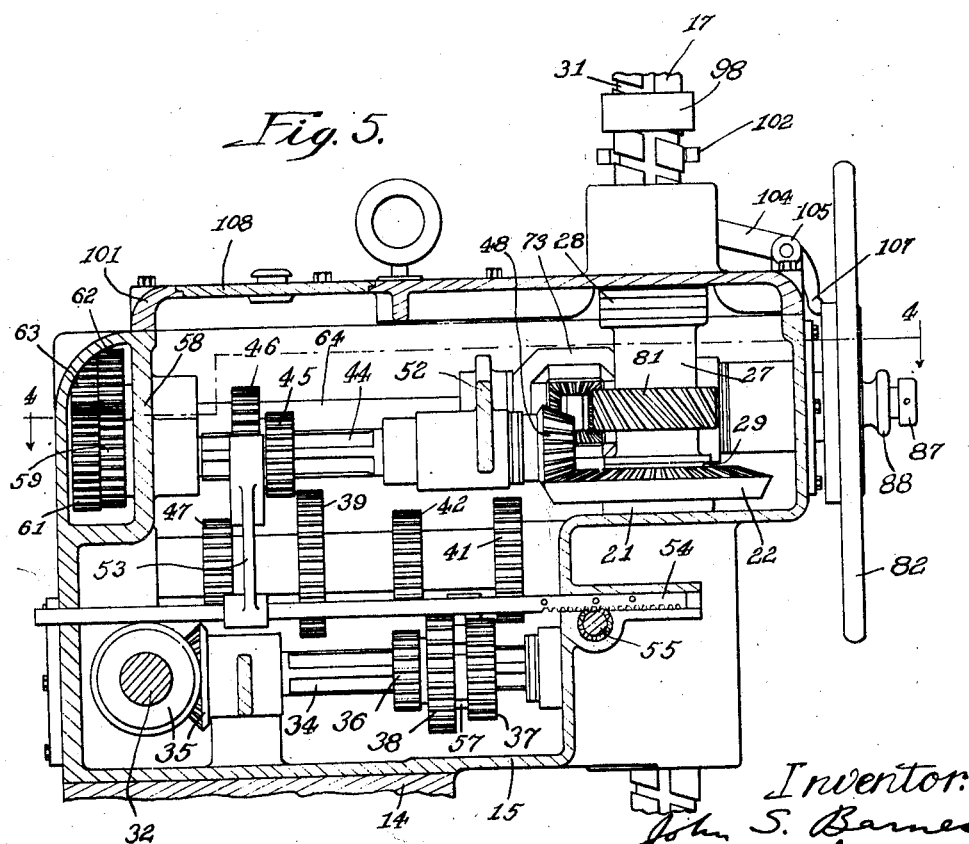

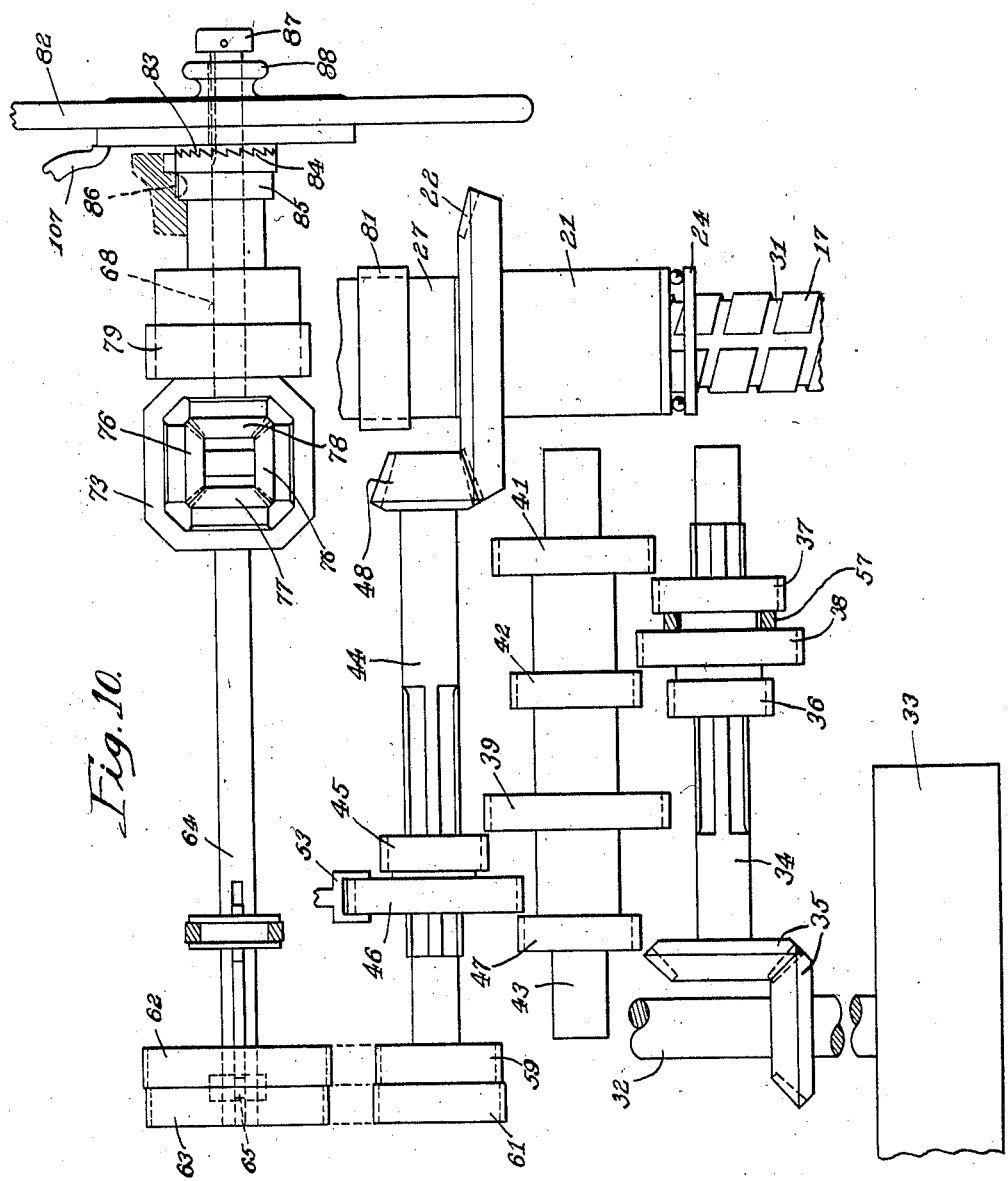

Patented May 8, 1928.

1,668,885

UNITED STATES PATENT OFFICE.

JOHN S. BARNES, OF ROCKFORD, ILLINOIS, ASSIGNOR TO W. F. & JOHN BARNES CO., OF ROCKFORD, ILLINOIS, A CORPORATION OF ILLINOIS.

MACHINE TOOL.

Application filed May 21, 1924. Serial No. 714,791.

This invention relates in general to machine tools and has more particular reference to one adapted for boring, drilling, reaming, facing and similar operations. My invention as it pertains to the mechanism for rotating and imparting movement to the tool bar or spindle, to the control thereof, and to other features described hereinafter, is applicable to either a horizontal or a vertical type machine. In other respects my invention pertains to a vertical machine and is distinctly advantageous in such embodiment.

My invention contemplates the provision of an improved boring and drilling machine characterized by its simplicity and sturdiness of construction, whereby it will take care of unusual stresses and strains imposed by the enormous pressure of boring tools and high speed twist drills of more or less large diameter when drilling materials of a very tough nature, without deflection or disalignment of the tool bar or spindle, and without chatter to the cutting edge of the tool, and further characterized by its simplicity and ease of control whereby changes in speed and feed of the tool bar and its direction of travel may be conveniently controlled.

In the application of my invention to a vertical machine I have aimed to provide a main frame comprising a base, a work table, an upright column and a tool bar housing cast integrally or bolted together so as to be in effect an integral structure, with the work table and spindle housing spaced apart a fixed distance, and to provide a tool bar or spindle of such length and so mounted and operated as to be capable of functioning under maximum loads at any and all points between the table and housing in absolute alignment and without deflection. In other words, instead of the usual practice of slidably mounting the work table or the spindle housing so that either one or the other may be adjusted to bring the work as close to the spindle housing as possible as has been essential for accuracy, I have in the present invention placed the work table and spindle or tool bar housing at the maximum distance apart and by reason of the rigid frame structure and the novel construction of the tool bar, its mounting and operating means, it may be operated at any point even at its most extended position, under heavy load, without chatter, deflection or disalignment. The feed is limited only by the length of the tool bar and the work accommodation by the fixed distance between the work table and the tool bar housing. To this end a large diameter tool bar or spindle is used so that when extended to the extreme position it will not flex or vibrate. A driving gear or sleeve having splined key connection to the tool bar is used for rotating it, thus reducing the pressure per square inch on the key or keys by reason of the large diameter of the bar and the mechanical advantage gained thereby. The feed pressure is imparted by a nut engaging a spiral groove on the tool bar, which groove has a predetermined pitch the angle which is such that the heavy bar will be sustained by the nut without turning it, thus obviating the need of spindle counter-balancing means, and at the same time the nut will by reason of such angle be turned by the tool bar when the latter is rotated as is contemplated by this invention in respect to the operation of a differential device which will be presently described.

Another purpose of my invention is to provide a differential device driven preferably but not necessarily by a change speed device which rotates the tool bar and connected to the above-mentioned feed nut on the tool bar for rotating the nut faster and slower than the bar for imparting feed and return movements thereto. This differential device is associated with the tool bar in a novel and particularly advantageous manner as will be explained more fully hereinafter.

Another purpose is to employ one of the driving members of the differential device to control movement of the feed nut by hand or otherwise, thus providing an exceptionally simple, convenient and accurate control.

Other objects are to provde an improved assembly of parts such as a tool bar, driving sleeve and feed nut therefor, and change speed and feed gearing in a tool bar housing, to provide an improved frame and housing structure, to provide an improved differential device and control for operating the feed nut, to provide for lubricating all of the operating parts, to provide an improved automatic stop for the feed, and to provide an improved work table and base.

Other objects and attendant advantages will be appreciated by those skilled in this art as the invention becomes better understood by reference to the following description when considered in connection with the accompanying drawings, in which—

Figure 1, is a front elevation of a machine tool embodying my invention;

Fig. 2, is a top view of the work table;

Fig. 3, is a side elevation of the machine with the work table in vertical section;

Fig. 4, is a horizontal section taken substantially on the line 4—4 of Fig. 5;

Fig. 5, is a vertical section taken substantially on the line 5—5 of Fig. 4;

Figs. 6, 7 and 8 are enlarged detail sections taken substantially on the lines 6—6, 7—7 and 8—8 respectively of Fig. 4;

Fig. 9, is a fragmentary top view of the machine; and

Fig. 10, is a diagrammatic drawing or chart showing the driving trains.

Referring more particularly to the drawings, I have shown a frame structure comprising a base designated generally by 11 shaped to provide a table-supporting portion 12 and a column-supporting portion 13 the latter of which has formed integrally therewith an upright column 14. On the top of this column is rigidly bolted a substantially one-piece tool bar housing designated generally by 15 which overhangs the table-supporting portion of the base. A work table designated generally by 16 is seated upon and rigidly bolted to said table-supporting portion 12. A tool bar or spindle 17 journaled in upper and lower co-axial bearings 18 and 19 fixed in the housing 15 in concentric relation to the work table is adapted to be rotated for revolving a cutting tool attached to its lower end and to be moved lengthwise for traversing toward and from the work and for feed movement which will be presently described. It will be observed at the present time that a practically integral frame structure is provided, so constructed that enormous pressures may be imparted between the tool bar housing and the work table without deflection between these parts and that if the tool bar is so constructed and mounted in connection with the housing as to be maintained at all times in absolute alignment there will be no disalignment of the cutting tool by reason of stresses set up in the frame structure or tool bar. It will be further observed the work table and the tool bar housing are at a fixed distance apart and are therefore determinative of the work accommodation and maximum feed length, although the tool bar may have a greater axial travel and feed through the work table as will be noted hereinafter. It follows that in a construction of this kind in which it is not possible to position the work table close to the housing 15, or to adjust its proximity thereto according to the size and nature of the work, the tool bar must be extended to the work and frequently operate at a considerably extended position. Such construction has heretofore been avoided by machine tool designers, so far as applicant is aware, because the conventional spindle is limited in its feed length and will chatter and run out of alignment when extended to its greatest limit. In the present invention these objections are overcome by journaling a large diameter tool bar in relatively rigid bearings spaced apart to give a long bearing to the tool bar on a frame part absolutely rigid with respect to the work table and in feeding the tool bar by a nut located between said bearings, the pitch of which nut performs certain definite functions as will be presently described.

Rotation is imparted to the tool bar as shown in Fig. 6 by a driving member preferably in the form of a sleeve 21 which forms an elongated hub for a driving gear 22. The driving sleeve rests on a thrust bearing 24 seated against the housing 15, is journaled in a bearing 25 in said housing, and transmits rotation to the tool bar by diametrically opposed keys 26 reaching from end to end of the sleeve and located in key or spline ways reaching substantially the full length of the bar. The remaining space on the tool bar between the drive sleeve 21 and the upper bearing 18 is occupied by a feed nut 27, an end thrust bearing 28 between the upper end of this nut and the housing 15 and an end thrust bearing 29 between the lower end of said nut and the driving sleeve 21. The feed nut engages throughout its length a spiral groove 31 in the periphery of the tool bar. Both the driving sleeve and the feed nut are accurately fitted in their connections with the tool bar so that there is no lost motion and they will have uniform contact with the tool bar throughout their pressure-applying surfaces. By utilizing practically all of the available space between the upper and lower bearings 18 and 19 for these connections it will be manifest that the pressure per square inch on said surfaces is reduced to a minimum. These surfaces are all kept well lubricated as will be explained hereinafter and consequently heavy pressures may be applied in continuous duty operation with practically negligible wear on these parts.

Mechanism is provided for rotating the drive sleeve 21 and feed nut 27 at variable speeds. When the feed nut and driving sleeve revolve at the same speed there will be no endwise movement of the tool bar and when the feed nut is revolved faster or slower than the driving sleeve the tool bar will be moved lengthwise in one direction or the other for feed and return movements. This mechanism includes in the present illustration of my invention a change-speed device for driving the sleeve 21 and a driving train operated by said change-speed device including a differential device for rotating the feed nut 27. This differential device includes a manually operable control member located at the front of the machine at present in the form of a hand wheel which is normally free to revolve as will be presently described so that no endwise movement will be transmitted to the tool bar and which may either be held from rotation so as to cause feed movement to be transmitted to the tool bar or turned in one direction for imparting a fast feed motion thereto or in the opposite direction for reversing the nut and thereby returning or elevating the tool bar. This provides a convenient, positive and sensitive control which applicant believes to be entirely novel in a machine of this type and which is thoroughly practical for the purpose for which it is intended.

Referring more particularly to the change-speed device for driving the driving sleeve 21, reference may be had to Figs. 4, 5 and 10. A prime drive shaft 32 at present operated by a belt pulley 33 drives a first speed shaft 34 through the agency of bevel gears 35. On the shaft 34 there is splined a cluster of gears 36, 37 and 38 graduated in diameter adapted to be selectively engaged with gears 39, 41 and 42 respectively, fixed to a second speed shaft 43. This shaft 43 is adapted to drive a third speed shaft 44 through the agency of gears 45 and 46 splined on the latter shaft and shiftable so as to engage the gear 45 with the gear 39 or a gear 46 with the gear 47 fixed to the shaft 43. The shaft 44 has fixed thereto a bevel pinion 48 meshing with the bevel gear 22 on the driving sleeve. This change-speed device provides for six changes in speed of rotation of the tool bar. The shafts 34, 43 and 44 are all suitably journaled in the housing 15 one above the other in parallel relation. This provides an ample number of speed changes for ordinary requirements and permits compact arrangement of the gearing beneath the shaft 44. Such arrangement also permits all of the shaft bearings to be supported directly in the housing and to be bored from one end or the other thereof as an economy factor in the production of these housings in large quantities. As noted in Fig. 6 the holes for the bearings 49 which support the adjacent ends of the shafts 34 and 43 are bored through the front of the housing and the outer ends of these holes are afterward filled with plugs 51. One of the bearings for the shaft 44 is carried by a transverse wall 52 cast integral with the housing 15. The gears 45—46 may be shifted by a fork 53 connected to a rack 54 (Fig. 5) in turn mounted for sliding movement in the housing 15 and adapted to be operated by a pinion 55 rotatable from the exterior of the housing by a hand lever 56. A yoke 57 connected to the cluster gears 36—37—38 may be shifted by means of a yoke 57 (Fig. 10) operated from a hand lever 58 on the opposite side of the housing by means of a connection similar to that just described for shifting the yoke 53.

The driving train from the tool bar driving shaft 44 to the feed nut, including the differential device above mentioned, will now be described. The shaft 44 extends beyond its bearing in a rear transverse wall 58 integral with the housing 15, and has keyed or otherwise removably connected thereto one or more gears, two at present, 59 and 61 which mesh respectively with gears 62 and 63 loose on a shaft 64. This shaft, journaled on bearings in the transverse walls 52 and 58 constitutes one of the driving members of the differential device and is adapted to be driven by either of the gears 62 or 63 by connecting either gear thereto as by means of a sliding key clutch 65 adapted to be operated by a shifter lever 66 having a pinion and rack connection with a yoke which directly shifts the key 65. The two gear sets operable between the shafts 44 and 64 are of different ratios designed for transmitting feed speeds and may be changed by removing the back cover 67. These gears determine the rate of feed per revolution of the tool bar, the feed being transmitted by the shaft 64 to the feed nut on the tool bar through the intermediary of the differential device. This device comprises a pair of coaxial driving members, one of which is the shaft 64 and the other a shaft 68 (Figs. 7 and 10) the former of which will be referred to herein as the first driving member or the power driving member and the latter as the second driving member or the hand operated driving member. These shafts are journaled in bearings 69 and 70 respectively carried in the trunnion ends 71 and 72 of an intermediate or planetary member of the differential designated generally by 73. The trunnion end 71 of the planetary member is journaled in a bearing 74 mounted on the transverse wall 52 of the housing and the trunnion end 72 is journaled in a bearing 75 on the front wall of the housing. The planetary member has journaled thereon in diametrically opposed relation a pair of planet gears 76 meshing with bevel gears 77 and 78 fixed to the first and second driving members 64 and 68 respectively. Keyed to the end 72 of the planetary member is a spiral gear 79 which meshes with a companion spiral gear 81 integral with the feed nut 27. On the forward end of the shaft 68 which projects beyond the housing is slidably keyed a manually operable member preferably in the form of a hand wheel 82 or the equivalent equipped on its hub with clutch teeth 83 adapted to engage complemental clutch teeth 84 fixed with respect to the housing, the teeth 84 being at present integral with a collar 85 secured by a key 86 to said housing. A collar 87 fixed to the extended end of the shaft 68 limits forward movement of the wheel 82 and the latter may be easily shifted into and out of engagement with the teeth 84 either by grasping any portion of the wheel or the hand grip 88 at the hub thereof. By means of the clutch thus provided the shaft 68 may be held from rotation in a counter-clockwise direction viewing Fig. 1. When so held, and the machine is in operation, the feed nut 27 will be rotated at a slightly faster speed than the tool bar, thereby imparting power feed to the tool bar. This will be manifest by reason of the fact that by holding the gear 78 the planetary gears 76 which are being rotated by the driving gear 77 will turn on and travel around said gear 78, thereby revolving the member 73 and its gear 79 and likewise the feed nut, and also by reason of the gearing ratio in the driving train. In the present arrangement of gearing there is a three to one ratio between the shaft 44 and the driving sleeve 21, a two to one reduction in the differential gearing, a one to one ratio between the gears 79 and 81 and a substantially two to three ratio between the gears 59 and 62 or the gears 61 and 63, these latter gears being known as mongrel gears, the first mentioned set having 64 and 95 teeth respectively and the second set 65 and 96 teeth. The first set of gears give a feed of .021 inches per revolution of the tool bar and the second set .031 inches per revolution. These ratios are merely illustrative of one example of my invention and are referred to for purpose of clarity only and not as a limitation. By varying the speed between these shafts 44 and 64 the rate of feed with respect to the rate of rotation of the tool bar may be correspondingly varied. When the shaft 68 is released by disengaging the clutch teeth 83—84 and the hand wheel 82 is left free to revolve, no endwise movement will be imparted to the tool bar. This is because the angle of the groove in the tool bar, that is the pitch angle, is great enough to rotate the feed nut with the tool bar, and the difference in speed between the planetary member 73 thus rotated and the power driven gear 77 will result in rotating the gear 78 and consequently the hand wheel 82 slowly in a clockwise direction viewing Fig. 1, it being noted that the gear 77 always revolves in a clockwise direction in the present example. It will now be manifest that the hand wheel 82 may be held from rotation by hand thus causing the driving power to be differentiated and transmitted through the planetary member 73 to the feed nut for transmitting feed at the rate above specified, and that by turning said hand wheel 82 to the right so as to make the gear 78 a driving member the planetary member 73 will be revolved at a faster speed and consequently the feed nut will be revolved faster so as to increase the rate of feed, and that by turning the hand wheel 82 in the reverse direction the feed nut 27 will be reduced to a speed slower than the speed of the tool bar, thereby elevating the tool bar. The hand wheel 82 becomes therefore a very sensitive control with a large mechanical reduction and positive feed to the tool bar. It will be noted that the feed is directly proportional to the rotation of the tool bar and that by varying the speed of the latter through means of the change speed controls 56 and 58 the rate of feed will be proportionally changed. The rate of feed may however be varied with respect to the rotation of the tool bar by means of the change-speed gearing operable between the shafts 44 and 64. The rate of feed may also be varied by hand operation of the control wheel 82 as above explained. By turning the hand wheel 82 rapidly to the right or left the tool bar may be moved in a rapid traverse or a return movement, respectively. A power rapid return movement is however provided by holding the gear 79 and consequently the feed nut from rotation whereby the tool bar will simply screw up through the nut. This is accomplished by a braking device best shown in Fig. 8 which consists of a friction shoe 89 adapted to frictionally engage the periphery 91 of a drum integral with the gear 79 so as to retard and hold the latter from rotation. The friction shoe is adapted to be pressed against the drum by means of a screw 92 threaded through the adjacent side wall of the housing 15 and bearing at its inner end against the shoe. A boss 92 on the shoe enters a central bore 94 in said screw and holds the shoe in position. By means of a depending hand lever 95 fixed to the screw 92 at the exterior of the housing the screw may be turned a partial rotation and the pitch of the screw is great enough so that by such movement the friction shoe will hold the drum. A coiled compression spring 96 in the bore 94 acts against the boss 93 to urge the friction shoe slightly against the drum 91, the tension of this spring being variable by means of the adjusting screw 97.

It will be noted that the spiral groove 31 has a predetermined pitch or angle sufficient to turn the feed nut with the tool bar when it is rotated and when the gear 78 is free to revolve by releasing the clutch 83—84 or the control wheel 82 as described above. The angle of the groove is also such that the tool bar will not turn the nut by its own weight and fall or gradually feed down. Furthermore, the tool bar will not turn the nut by reason of the endwise pressure or thrust imposed by boring or drilling; consequently the differential device will not be affected by such endwise pressure. By reason of this construction the use of a counterbalancing weight or the equivalent is obviated.

An automatic stop for the feed is provided consisting of a collar 98 adapted to be clamped at any position on the end of the tool bar extending above the housing, a yoke 102 straddling the tool bar and adapted to be actuated by the collar 98 and being fixed to a rod 103 vertically slidable in a suitable bearing on the housing, and a lever 104 pivotally mounted at 105 on said housing and pivotally connected at its end 106 to the lower end of the rod 103 and having a depending end 107 adapted to engage the hub portion of the hand wheel 82 for disengaging the clutch 83—84. It will be manifest that by properly setting the collar 98 it will strike the yoke 102 during the feed movement and disengage said clutch so as to stop the feed at a predetermined point.

The housing 15 is designed to provide an oil reservoir for the gearing and operating parts therein so that oil contained in said reservoir will be picked up by such gearing and carried to all operating parts requiring lubrication. Said reservoir may be replenished through an opening in the top of the housing normally closed by a cap 108. Said top of the housing is preferably in the form of a cover plate 101 carrying the upper tool bar bearing 18 and being rigidly bolted to the housing proper. Removal of the cover plate 101 gives access to the interior of the housing for assembling, inspection and repair.

My invention also contemplates an improvement in the work table and base with respect to handling the cutting compound or lubricant used on the tool. Such liquid may be delivered in a stream to the tool by any suitable means and at present I have shown a flexible delivery nozzle 109 reaching forwardly from the column 14 and supplied by a pump (not shown) which draws the liquid from a reservoir or tank formed by the base. It will be observed in Figs. 2 and 3 that the work table has a marginal trough 111 and return conduit 112 whereby the compound which drains into this trough will be delivered through an opening 113 in the table supporting portion of the base into the tank below. In this instance the work table is cast in one piece to provide the table proper 114, a marginal trough 111 and the conduit 112 communicating with the tank in the base. The table has T-slots 115 for clamping work thereto and is rigidly secured to the table-supporting portion of the base by means of three bolts 116. The table may however be otherwise rigidly attached to the base or cast integral therewith. A central opening 117 is provided in the table to permit the tool bar to be fed down through it as is desired in certain cases when using the tool bar as a boring bar, in which case a suitable pilot bearing may be provided in the base or table for guiding the extended end of the bar, although such bearing is not essential.

In practice my invention as regards the mounting, operation and control of the tool bar may be embodied in either a horizontal or a vertical boring or drilling machine or any machine tool in which a tool carrying bar or spindle is employed. In other respects the organization of parts in a frame structure of the character described is particularly desirable and advantageous in a vertical type of machine.

It is believed that the principles and mode of operation of my invention will be readily understood from the foregoing; and while I have illustrated but a single working embodiment, changes might be made in the construction and arrangement without departing from the spirit and scope of the invention as expressed in the appended claims, in which—

I claim:

1. In a machine tool, in combination, a tool bar having a spiral groove, means for rotating the tool bar, a feed nut engaging said spiral groove and adapted to be rotated for moving the tool bar lengthwise, and means for rotating the feed nut including a differential device having a power driving member in geared connection with the tool bar rotating means, a planetary member geared to the feed nut, a hand driving member connected to the planetary member and operable to impart rotation to the feed nut during and supplemental to rotation thereof by the power driving member, said geared connection being of such ratio as to impart lengthwise feed movement to the tool bar when the hand driving member is held from rotation, and means for holding said hand driving member from rotation.

2. In a machine tool, in combination, a tool bar, a driving member in which the tool bar is slidably keyed, a feed nut having threaded connection with the tool bar, and means for rotating the feed nut including a differential device having a first driving member in geared connection with the tool bar driving member, a second driving member adapted to be turned by hand or to be held from rotation, and an intermediate planetary member geared to the feed nut, the gear ratio between said tool bar driving member and said first driving member being such as to impart lengthwise feed movement to the tool bar when the second driving member is held from rotation.

3. In a machine tool in combination, a tool bar, means for rotating the tool bar, a feed nut for moving the tool bar lengthwise, and means for rotating the feed nut including a differential device having a first and a second driving member and an intermediate member, the latter member being geared to the feed nut and the first driving member being driven in timed relation with the tool bar rotating means at a rate slightly in excess of the reduction ratio of the differential, whereby to transmit feed to the tool bar when the second driving member is held from rotation.

4. In a machine tool, in combination, a tool bar having a spiral groove, means for rotating the tool bar, a feed nut engaging said spiral groove and adapted to be rotated for moving the tool bar lengthwise, means for rotating the feed nut including a differential device having in geared connection one member geared to the feed nut, another member power driven, and another member adapted to be held from rotation, or released so as to be free to rotate, or to be rotated independently of the power driven member for imparting lengthwise feed movement to the tool bar, and means for holding the third mentioned member for rotation, the angle of said groove being such as to cause the third mentioned member to be rotated by rotation of the tool bar when said member is released, whereby no lengthwise feed movement will be transmitted to the tool bar while the said power driven member is rotating.

5. In a machine tool, in combination, a tool bar having a spiral groove, means for rotating the tool bar, a feed nut engaging said groove, means driven by said bar-rotating means for rotating the feed nut including a differential device having a first and a second driving member and an intermediate planetary member, the latter member being geared to the feed nut and the first driving member being geared to said bar-rotating means in such ratio as to transmit feed to the bar when the second driving member is held from rotation and means whereby the second driving member may be held from rotation or permitted to rotate at will.

6. In a machine tool, in combination, a tool bar having a spiral groove, means for rotating the tool bar, a feed nut engaging said groove, means driven by said bar-rotating means for rotating the feed nut including a differential device having a first and a second driving member and an intermediate planetary member, the latter member being geared to the feed nut and the first driving member being geared to said bar-rotating means in such ratio as to transmit feed to the bar when the second driving member is held from rotation, and a hand control member connected to said second driving member and adapted to be optionally operated to hold said second driving member from rotation, or to rotate said second driving member in one direction to feed the tool bar at a faster rate or in the opposite direction to impart return movement to the tool bar.

7. In a machine tool, in combination, a tool bar having a spiral groove, means for rotating the tool bar, a feed nut engaging said groove, means driven by said bar-rotating means for rotating the feed nut including a differential device, the planetary member of which is geared to the feed nut and rotated by the tool bar through the incline of the spiral groove when the second driving member of the differential device is free, and a hand control for said second driving member adapted to stop rotation thereof, whereby the planetary member of the differential device will rotate the feed nut at such speed as to move the tool bar lengthwise.

8. In a machine tool, in combination, a tool bar having a spiral groove, means for rotating the tool bar, a feed nut engaging said groove, and a differential device having a first and a second driving member and an intermediate planetary member the latter of which is geared to the feed nut, the first driving member being power driven and geared to the tool bar at a rate for imparting power feed to the tool bar through the feed nut when the second driving member is free to rotate.

9. In a machine tool, in combination, a tool bar having a spiral groove, means for rotating the tool bar, a feed nut engaging said groove, and a differential device having a first and a second driving member and an intermediate planetary member the latter of which is geared to the feed nut, manually operable means for rotating the second driving member, and power operating means for rotating the first driving member at a rate different from the rotation of the tool bar for imparting feed movement thereto.

10. In a machine tool, in combination, a tool bar, means for rotating the tool bar, a feed nut for imparting lengthwise movement to the tool bar, and a differential device having a first and a second driving member and an intermediate planetary member, the latter member being geared to the feed nut, said first driving member being geared to the tool bar and at such speed as to impart lengthwise movement thereto when the second driving member is held from rotation.

11. In a machine tool, in combination, a tool bar, means for rotating the tool bar, a feed nut for imparting lengthwise movement to the tool bar, a differential device having a first and a second driving member and an intermediate planetary member, the latter member being geared to the feed nut, said first driving member being driven in timed relation to the rotation of the tool bar and at such speed as to impart lengthwise movement thereto when the second driving member is held from rotation, and a hand control for said second driving member whereby it may be turned by hand in either direction simultaneously with rotation of the first driving member for revolving the feed nut at a faster or a slower rate.

12. In a machine tool, in combination, a tool bar having a spiral groove, a housing in which the tool bar is mounted to revolve on a vertical axis, a driving member in which the tool bar is slidably keyed, a nut on the tool bar engaging said groove, a differential device including a driving member, a control member and an intermediate member the latter of which is geared to said nut, said spiral groove being of such pitch as to prevent rotation of the nut by the weight of the tool bar and to cause the nut to be rotated by the tool bar when said control member is free to rotate, and means for holding said control member from rotation whereby said nut will be rotated to impart feed movement to the bar.

13. In a machine tool, in combination, a tool bar having a spiral groove; a driving sleeve in which the tool bar is slidably keyed; a feed nut engaging said groove; a gear fixed to the driving sleeve; a shaft having a fixed gear meshing with said sleeve gear; a differential device comprising a first driving shaft, a second driving shaft, a differential casing, and gears intermediate said shafts and casing; spiral gears connecting said differential casing and feed nut; means for holding the second driving shaft from rotation; and a driving connection between the first mentioned shaft and the first driving shaft of the differential; said gearing and driving connections being of such ratios that when said second driving shaft is held, endwise feed movement will be transmitted to the tool bar by rotation of the feed nut.

14. In a machine tool, in combination, a tool bar having a spiral groove, a driving sleeve in which the tool bar is slidably keyed, a feed nut engaging said groove, a sleeve driving shaft, a gear connection between the sleeve and its driving shaft having a three to one reduction, a differential device having a two to one reduction, a one to one spiral gear connection between the planetary member of the differential device and the feed nut, means for holding one of the two driving members of the differential device from rotation, and gearing connecting the sleeve driving shaft and the driving member of said differential device having such ratio as to produce endwise feed movement of the tool bar.

15. In a machine tool, in combination, a spirally grooved tool bar, a drive gear in which the tool bar is slidably keyed, a feed nut engaging the tool bar, a drive shaft having a gear in mesh with said drive gear, and a driving train between said drive shaft and the feed nut comprising a shaft parallel with the drive shaft, gearing connecting said shafts, a differential gear mechanism including coaxial gears and intermediate planet gears, one of said coaxial gears being fixed to the second mentioned shaft and the other constituting a control gear, a casing connecting the planet gears and having a gear connection with the feed nut, means for holding the control gear from rotation, the gear ratios being such that feed motion will be transmitted to the tool bar when said control gear is held.

16. In a machine tool, in combination, a spirally grooved tool bar, a drive gear in which the tool bar is slidably keyed, a feed nut engaging the tool bar, a drive shaft having a gear in mesh with said drive gear, and a driving train between said drive shaft and the feed nut comprising a shaft parallel with the drive shaft, gearing connecting said shafts, a differential gear mechanism including coaxial gears and intermediate planet gears, one of said coaxial gears being fixed to the second mentioned shaft and the other constituting a control gear, a casing connecting the planet gears and having a gear connection with the feed nut, means for holding the control gear from rotation, the gear ratios being such that feed motion will be transmitted to the tool bar when said control gear is held, and means for imparting rotation in either direction at will to said control gear whereby to impart feed motion to the tool bar.

17. In a machine tool, in combination, a spirally grooved tool bar, a drive gear in which the tool bar is slidably keyed, a feed nut engaging the tool bar, a drive shaft having a gear in mesh with said drive gear, and a driving train between said drive shaft and the feed nut comprising a shaft parallel with the drive shaft, gearing connecting said shaft, a differential mechanism including coaxial gears being fixed to the second mentioned shaft and the other constituting a control gear, a casing connecting the planet gears and having a gear connection with the feed nut, means for holding the control gear from rotation, the gear ratios being such that feed motion will be transmitted to the tool bar when said control gear is held, and manually operable means for revolving said control gear in either direction at will whereby to impart feed and return movement to the tool bar when said drive shaft is not in motion and to impart rapid traverse and return motion to the tool bar when said drive shaft is in motion.

18. In a machine tool, in combination, a housing, a tool bar mounted therein for rotation and endwise movement, mechanism in the housing for rotating the tool bar and imparting lenghtwise movement thereto including a differential device for imparting latter movement, said differential device having a control member extending beyond the housing and adapted to be held from rotation to cause lengthwise movement to be transmitted, the tool bar being extended beyond the housing and equipped with an adjustable stop element, and means adapted to be actuated by said stop element and operative upon said control member for rendering it free to rotate, whereby to stop said lengthwise movement of the tool bar.

19. In a machine tool, in combination, a tool bar having a spiral groove and a longitudinal keyway, a drive sleeve on the tool bar engaging in said keyway, a feed nut on the tool bar engaging said spiral groove, and a power driving connection directly between said drive sleeve and feed nut including a differential device, means geared to the drive sleeve for driving the differential device at such speed as to impart feed movement to the tool bar when one member of the differential device is held from rotation, and means for holding said one member of the differential device from rotation at any time during the power drive of said sleeve and feed nut.

20. In a machine tool, in combination, a tool bar having a spiral groove, a feed nut engaging the spiral groove, and power drive mechanism for simultaneously rotating the tool bar and the feed nut including a differential device, said device having in geared connection a power drive member, a manually operable drive member, and a planetary member, the latter member being geared to the feed nut, and means for holding the manually operable drive member from rotation while the planetary member is being driven by the power drive member.

21. In a machine tool, the combination set forth in claim 20, in which the drive ratio between the feed nut and the tool bar will cause the latter to be fed lengthwise in the nut when the manually operable member is held from rotation.

22. In a machine tool, in combination, a tool bar having a spiral grove, a drive sleeve in which the tool bar is slidably keyed, a feed nut engaging said spiral groove, and power drive means connected to said sleeve and nut for simultaneously rotating them, said power drive means including a differential device having a first driving member, a second driving member and a driven member, the driven member being connected to the feed nut for rotating it, the first driving member being power driven, the second driving member being rotatable independently of the first driving member for imparting rotation to the feed nut supplemental to that imparted by the first driving member, and means for so rotating the second driving member.

23. In a machine tool, the combination set forth in claim 22, including means for holding the second driving member from rotation, the power drive means between the sleeve and nut being of such ratio as to produce endwise feed of the tool bar when said second driving member is held from rotation.

JOHN S. BARNES.